May 27, 1930. W. P. BRADFORD 1,760,810
FAUCET
Filed Oct. 3, 1928
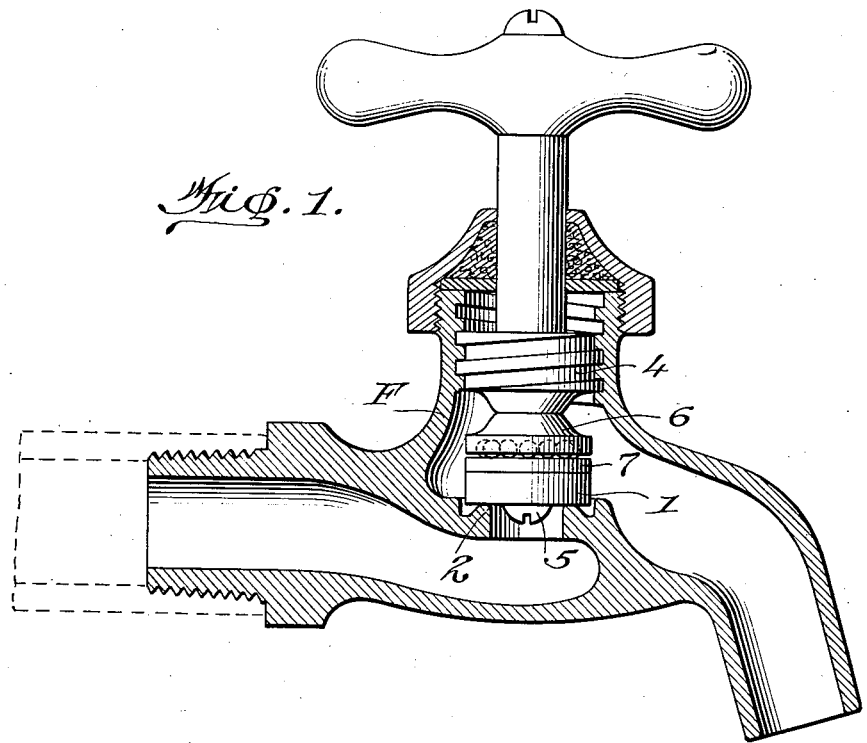
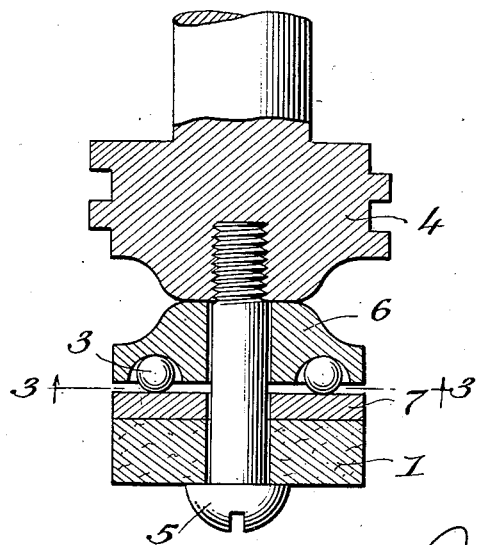
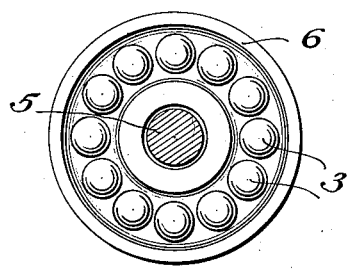
Inventor
W. P. Bradford
By James J. Sheehy & Co.
Attorneys Patented May 27, 1930

1,760,810

UNITED STATES PATENT OFFICE

WINSLOW P. BRADFORD, OF BUFFALO, NEW YORK

FAUCET

Application filed October 3, 1928. Serial No. 310,071.

My present invention pertains to valves for faucets and it contemplates the extremely simple, inexpensive and ingenious construction of valve and washer therefore through the medium of which control of the flow of water passing through the faucet is accomplished without the annoyance of leakage of the faucet when the flow is cut off due to wearing out of the washer when contacting the valve seat.

Another object of the invention is to provide a practical valve stem and washer manufactured as a single unit or the provision of the stem and washer as a unit to replace leaky valves by the simple expedient of removing the old valve stem and washer and replacing same with my novel construction.

Other objects and advantages of the invention will be fully understood from the following description and claims when the same are read in connection with the drawings accompanying and forming part of this specification, in which Figure 1 is a longitudinal sectional view of a faucet and showing my novel valve stem and washer arranged therein.

Figure 2 is a detail sectional view of the stem, washer, balls and casing therefor.

Figure 3 is a view taken in the plane indicated by the line 3—3 of Figure 2 and looking in the direction of the arrows.

Similar numerals of reference designate corresponding parts in all the views of the drawings.

I illustrate a faucet F and arranged in the usual manner in the said faucet is the well known valve seat 2, the valve stem 4, the washer 1 and the stem screw 5 through the medium of which the washer is secured to the end of the stem 4, the washer being rotatably mounted on the stem screw. The stem 4 and the stem screw 5 taken together may be considered as constituting the valve stem.

Arranged above the washer 1 is the lower portion 7 of a ball casing, and this portion is movably mounted on the stem screw and bears snugly on the washer 1, while mounted on and adapted to bear against the lower end of the stem 4 is the upper portion 6 of the ball casing.

Resting between the upper and lower portions of the casing are balls 3 that are made of non-corrosive material and are adapted to seat in a kerf of the portion 6 of the ball casing and bear against the lower portion 7 of the casing.

In the practical operation of the invention when the washer 1 comes in contact with the seat 2 the upper portion 6 of the ball casing turns approximately one-half revolution and compresses the balls 3 to force the lower portion 7 of the casing and washer 1 snugly against the seat 2. Manifestly the washer 1 does not turn and hence cannot be ground out by friction of a rotary type against the seat. In other words, after the washer is initially seated subsequent seating is merely a matter of downward pressure and it will be readily apparent that such pressure will not be attended by disintegration or injury to the valve washer.

The device is comprised of elements that are well qualified to withstand the rough usage to which valves and washers are ordinarily subjected without fear of injury to the washer and consequently subsequent costs of replacing washers and the annoyance of a leaky faucet are entirely eliminated.

I would distinctly have it understood that I do not wish to be confined to any particular construction of ball casing or washer as any configuration of casing and washer may be employed as fairly fall within the scope of the claims appended.

What I claim, is:

1. In a device for the purpose specified, the combination of a valve stem, a washer, a stem screw securing the washer to the stem, the washer being rotatable relative thereto, a casing slidably arranged on the stem screw above the washer and comprising upper and lower portions, one of which is provided with a kerf on its lower face and balls arranged in the kerf whereby when pressure is exerted by the stem on the upper portion of the casing, the lower portion of the casing and washer will be moved downwardly, substantially as and for the purpose specified.

2. The combination of a valve stem, a washer secured to the stem and rotatable relative thereto, a casing arranged on the stem and movable thereon and comprising upper and lower members; one of which is provided with a kerf, bearings arranged in the kerf and so constructed and arranged that when pressure is exerted by the stem on the upper portion of the casing the lower portion of the casing will coact with the washer to move downwardly.

3. The combination of a valve stem, a washer arranged adjacent the stem, a casing arranged on the stem and movable thereon and comprising upper and lower members; one of which is provided with a kerf, bearings arranged in the kerf and so constructed and arranged that when pressure is exerted by the stem on the upper portion of the casing, the lower portion of the casing will coact with said upper portion to move downwardly against the washer.

In testimony whereof I have hereunto set my hand.

WINSLOW P. BRADFORD.